Jan. 17, 1939.　　　　C. T. PFLUEGER　　　　2,144,122
ROD BUTT CAP AND HOOK HOLDER
Filed March 20, 1937
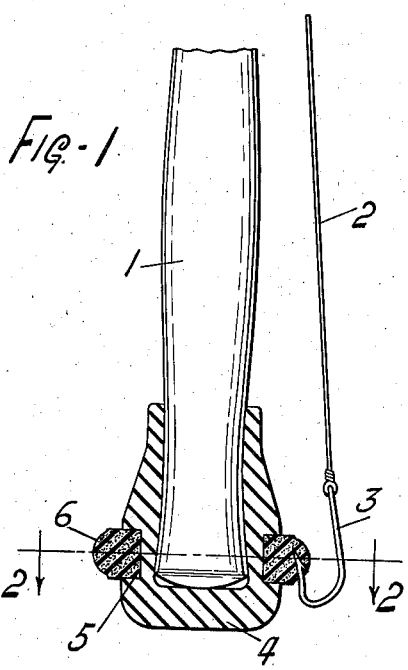
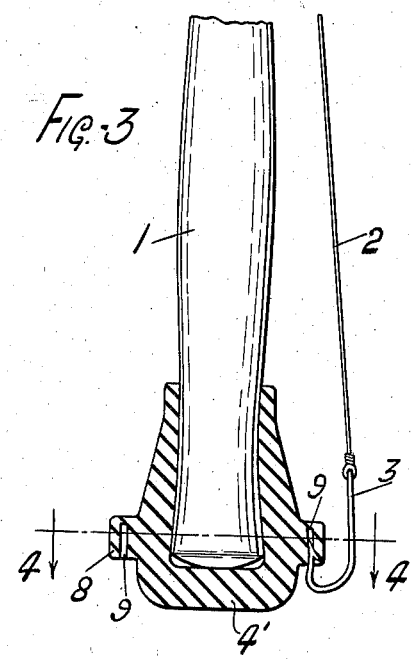
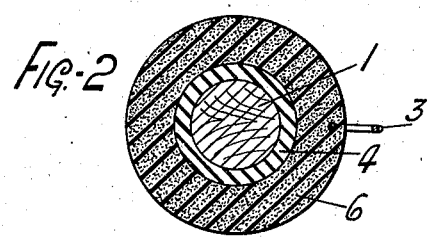
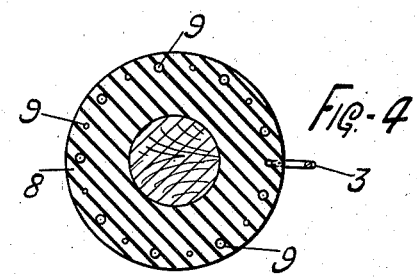
INVENTOR
CHARLES T. PFLUEGER
BY
Albert L. Ely
ATTORNEY Patented Jan. 17, 1939

2,144,122

UNITED STATES PATENT OFFICE 2,144,122

ROD BUTT CAP AND HOOK HOLDER

Charles T. Pflueger, Akron, Ohio, assignor to The Enterprise Manufacturing Company, Akron, Ohio, a corporation of Ohio Application March 20, 1937, Serial No. 132,110

6 Claims. (Cl. 43—25)

This invention relates to the art of fishing and particularly to an improved device by which the fisherman is afforded an added grip for the end of the rod or cane pole and is provided with a convenient retainer for the hook.

The device consists of a rubber cap or ferrule which is placed on the end of the rod to provide a cushioning grip and with which is associated a ring or formation into which the hook may be inserted. The same device, therefore, serves as a grip member and also as a keeper for the hook. By providing a convenient means for receiving the hook, it is prevented from catching in the person or clothing of the fisherman or hooking onto a part of the boat or other obstacle when the rod is not in use. Spare hooks may be conveniently retained in the device.

In the drawing and specification there are shown and described two forms of the invention, but it will be understood that other forms may be employed without departing from the essential features thereof or sacrificing any of its benefits.

In the drawing:

Fig. 1 is a sectional view of the preferred form of the device on the end of the rod;

Fig. 2 is a section on the line 2—2 of Fig. 1;

Fig. 3 is a view similar to Fig. 1 of the modified device; and

Fig. 4 is a section on the line 4—4 of Fig. 3.

The numeral 1 indicates the butt end of a fishing rod of any preferred type, 2 the line and 3 the hook. The grip member is indicated by the numeral 4 and is in the form of a rubber ferrule which is fitted onto the end of the rod. The interior diameter of the ferrule should be slightly less than the diameter of the rod so that the ferrule may be stretched to fit snugly about the rod.

In the preferred form of the invention shown in Figs. 1 and 2, the ferrule is molded or formed with a channel 5 in which is seated a sponge rubber ring 6, preferably cemented in place in the channel. This sponge rubber ring makes a soft yielding grip or abutment for the rod and assists materially in increasing the grip upon the rod so that it cannot slip through the hand. In addition, the ring is a convenient and practical retainer for the hook when the rod is not in use. The sponge rubber offers little resistance to the entry of the hook or hooks and yet holds it or them firmly in place.

In the form of the invention shown in Fig. 3, the ferrule 4' is molded with an integral outstanding rib 8 in which are formed a series of holes 9, preferably of different sizes, in which hooks may be received. In either form the outstanding ring assists in retaining the pole beneath a seat of the fishing boat.

It will be understood that where the term "rod" is employed in the claims, this is intended to cover either a rod or a pole.

What is claimed is:

1. An attachment for fishing rods consisting of a cup-shaped ferrule of rubber fitted over the butt-end of the rod, said ferrule being formed with a channel around its outer periphery and a sponge rubber ring seated within the channel and projecting outwardly from the ferrule to form a yielding gripping surface and a retainer for the point of the hook.

2. An attachment for fishing rods consisting of a cup-shaped ferrule fitted over the butt-end of the rod, and a ridge located intermediate the top and bottom of the attachment and projecting outwardly from the ferrule, said ridge being adapted to be gripped and to receive and retain the point of a hook.

3. An attachment for fishing rods consisting of a cup-shaped ferrule fitted over the butt-end of the rod and a ridge of sponge rubber surrounding the ferrule and projecting therefrom to afford an added grip for the rod and to receive the point of the hook.

4. An attachment for fishing rods consisting of a cup-shaped ferrule of rubber fitted over the butt-end of the rod, an integral ridge molded therewith and surrounding the ferrule so as to afford an added grip for the rod, and a hole in the rib to receive the point of the hook, the ridge being spaced from the base of the attachment for a distance sufficient so that the bent portion of the hook is protected by the base.

5. An attachment for fishing rods consisting of a cup-shaped ferrule of rubber fitted over the butt-end of the rod and having a plurality of holes of varying sizes to receive fish hooks.

6. An attachment for the butt end of a fishing rod consisting of a cup-shaped portion fitting over the end of the rod and yieldingly gripping the same, and a part extending circumferentially of the first-mentioned portion and projecting radially therefrom, for receiving and retaining the point of a fish hook, the hook receiving part being spaced from the base of the attachment a distance so that the bent portion of the hook is protected by the base.

CHARLES T. PFLUEGER.